June 17, 1952 L. D. STATHAM ET AL 2,600,701
TRANSDUCER AND DEVICE EMPLOYING THE SAME
Filed Oct. 17, 1949 3 Sheets-Sheet 1
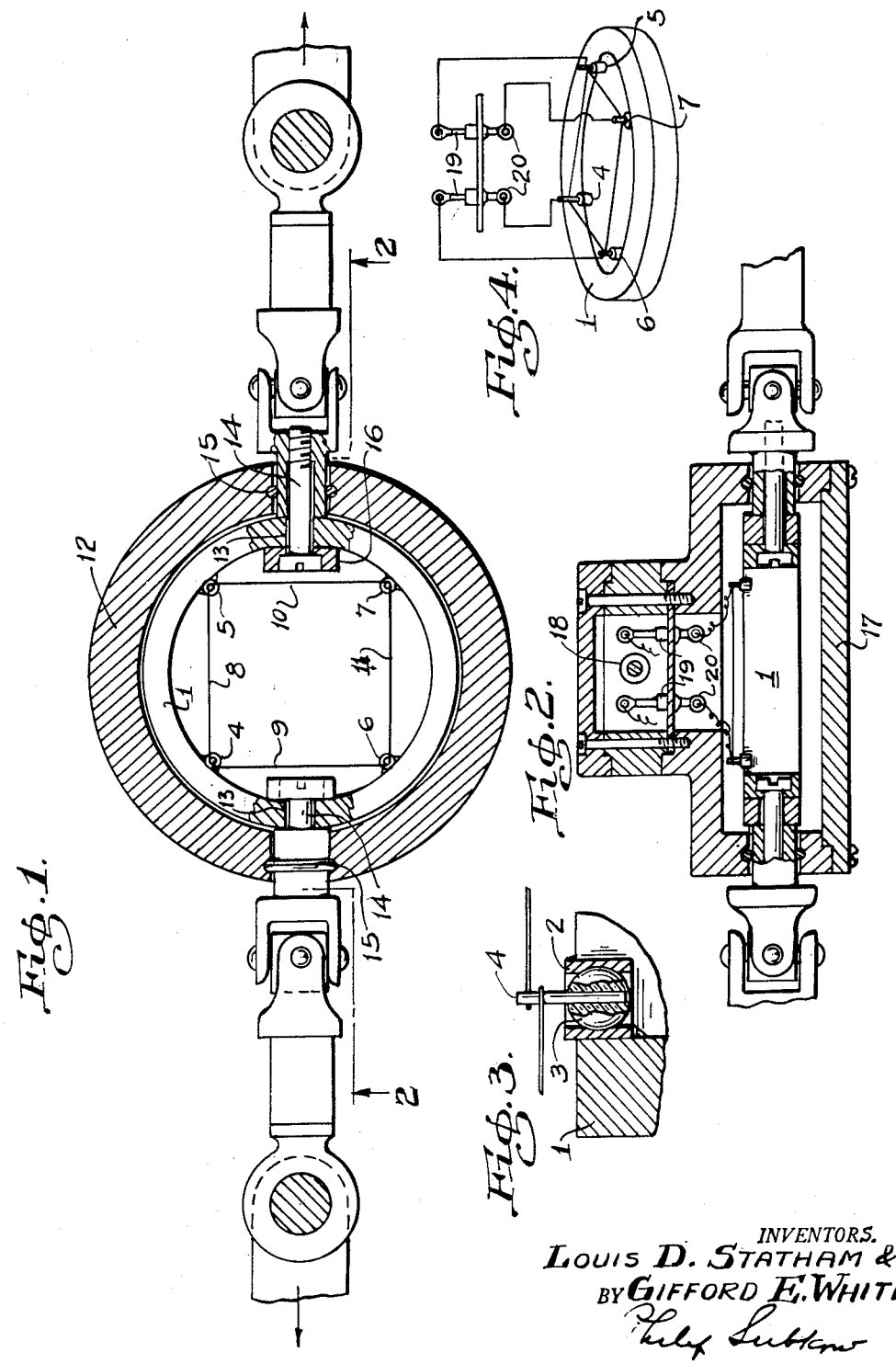
INVENTORS.
LOUIS D. STATHAM &
BY GIFFORD E. WHITE
ATTORNEY.

INVENTORS.
LOUIS D. STATHAM &
GIFFORD E. WHITE
BY Philip Subkow
ATTORNEY.

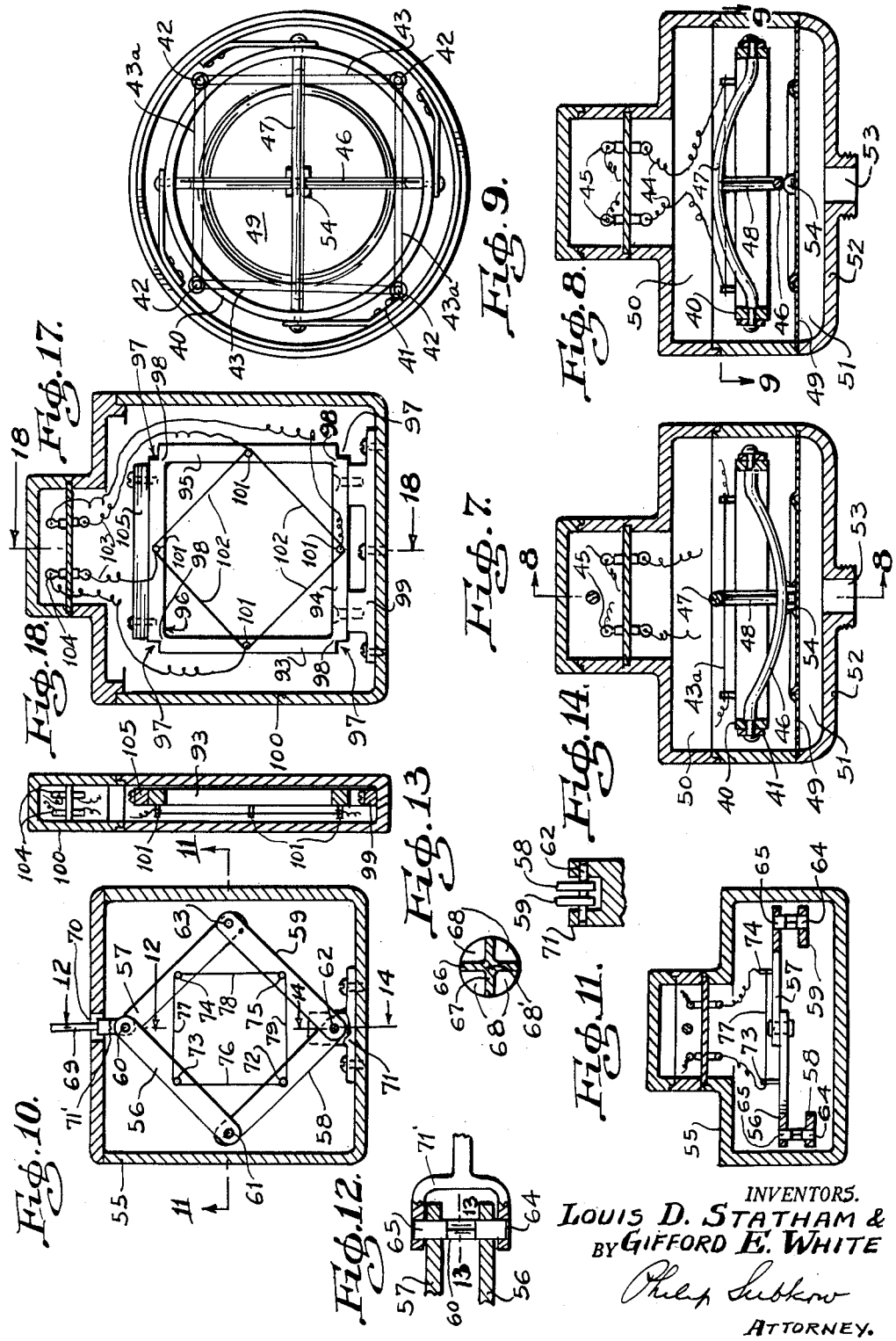

Patented June 17, 1952

2,600,701

UNITED STATES PATENT OFFICE 2,600,701

TRANSDUCER AND DEVICE EMPLOYING THE SAME

Louis D. Statham, Beverly Hills, and Gifford E. White, Tarzana, Calif., assignors to Statham Laboratories, Inc., Beverly Hills, Calif., a corporation of California Application October 17, 1949, Serial No. 121,882

23 Claims. (Cl. 201—63)

This invention relates to improvements in transducers, particularly to that form of transducer for use in the measuring of forces in which unbonded electrical strain wire gages are employed. As is now well known and as is shown in the Carlson Patent No. 2,036,458 and in the Statham Patents No. 2,453,548; No. 2,453,550; No. 2,453,551, and Serial No. 760,773, filed July 14, 1947, by Louis D. Statham, Patent No. 2,481,792, the variations in strain imposed upon a wire resulting from the imposition of a force result in a change in resistance of the wire which is proportional to the force applied and whereby the force may be measured. In the structure of such patents the force is applied so as to increase the strain in one system of wires and to decrease the strain in another system of wires. The wires are connected in a Wheatstone bridge arrangement so that this variation in strain causes an unbalance in the bridge and therefore permits of measurement of the applied force. In all such systems, one end of the wire is anchored at a fixed point and the other or free end of the wire is connected to the force applying means, the relative approach or separation of the wire supports resulting in said increase or decrease of the strain in the wires respectively.

These prior art systems may be generally classified in two forms: one as shown in the Carlson Patent No. 2,036,458 in which the line of force application is substantially parallel to the wires, and the other as shown in the Statham Patents No. 2,453,548; No. 2,453,550; and No. 2,453,551 wherein the force application is perpendicular to the axis of the wires. In both such systems the movable point is mounted upon a structure termed an armature which is hinged. In all such systems the hinge is weak, since it is designed to have a resistance to movement which is less than the spring rate of the wire; in other words, the main portion of the resistance to the movement caused by the applied force is in the wires themselves. The necessity of developing such a hinge which is capable of being rigidly attached to the movable and the immovable members has resulted in the choice of leaf springs. In such prior art forms, therefore, the movable member or armature is suspended upon a leaf spring which is attached to the immovable section of the unit. Various problems have arisen as a consequence of this type of construction.

It is characteristic of all such systems that they have considerable hysteresis and zero shift with temperature. The phenomenon of hysteresis evidences itself as follows: The variation in unbalance of the bridge per unit of applied force is greater as the force is increased than the unbalance of the bridge per unit change in force if the force is decreasing. Consequently where the force is varying there is an uncertainty in the record obtained unless correction is made therefor. To a large measure this hysteresis is occasioned by the use of such leaf springs, the use of which arises from the fact that a wire is stretched between a fixed and a movable support.

The transducers of our invention are characterized by and distinguished from such prior art unbonded gages in that the supports for strain wires, usually one at each end of the wire, are subjected to movement with respect to each other upon the application of force or displacement being measured. In the transducers of this invention, upon application of any displacing force, the ends of the wire which is held under an original stress and subjected to an applied stress either approach or depart from each other, depending upon whether the applied stress increases or decreases the strain in the wire, and if more than one wire system is used, such ends vary in relation to each other and to the ends of all the other wires of the system, there being no wire support which bears a fixed relation to another wire support during such increase or decrease in the strain on the wire.

In the preferred embodiment of the invention, the wires are mounted on pins positioned in a deformable structure, and means is provided whereby the force or displacement to be measured is transmitted to the deformable structure so as to cause the structure to deform, and as a result of this deformation, the linear distance between certain of the pins is reduced while the linear distance between other of said pins is increased.

These and other objects of this invention will be understood by reference to the further description of this invention taken together with the drawing, in which Fig. 1 is a plan view partly in section of one form of transducer and one form of instrument employing the same;

Fig. 2 is a view taken along line 2—2 of Fig. 1;

Fig. 3 is a detail of the pin and wire mounting;

Fig. 4 is a schematic wiring diagram of the transducer shown in Fig. 1;

Fig. 7 is a view partly in section of a pressure gage employing the transducer of this invention;

Fig. 8 is a section taken along line 8—8 of Fig. 7;

Fig. 9 is a section taken on line 9—9 of Fig. 8;

Fig. 10 is a view partly in section of another form of the transducer of the invention;

Fig. 11 is a view taken along line 11—11 of Fig. 10;

Fig. 12 is a view taken along line 12—12 of Fig. 11;

Fig. 13 is a section taken along line 13—13 of Fig. 12;

Fig. 14 is a section taken along line 14—14 of Fig. 10;

Fig. 17 is a sectional view of another form of the transducer in one form of instrument; and Fig. 18 is a section taken on line 18—18 of Fig. 17.

Figure 16:
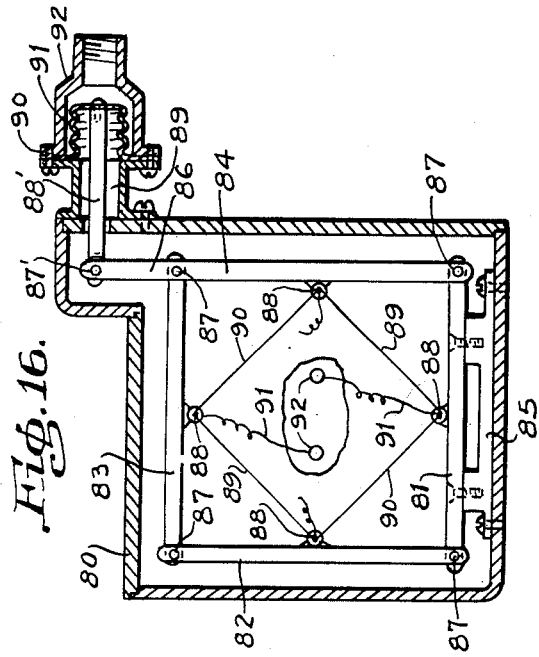
Fig. 16 is a view taken along line 16—16 of Fig. 15.

In the transducer of the form shown in Fig. 1, the distortable member is a ring 1. Diametrically opposed and spaced 90° apart are four bushings 2 soldered to the interior of the ring and carrying glass or other insulating beads 3 in which metallic pins are mounted perpendicular to the plane of the ring. Four such pins and mountings are provided as indicated at 4, 5, 6, and 7, spaced 90° apart. A loop of electrical resistance strain wires composed of four arms 8, 9, 10, and 11 may be wound around the pins 4, 5, 6, and 7 and electrically connected together as by soldering them to the metallic pin 4. Instead of being one wire loop, four loops of wire may be wound with as many turns as desired, for example, one between 4 and 6; one between 4 and 5; one between 5 and 7; and one between 7 and 6. It will be observed that these four wires are connected as the four arms of a Wheatstone bridge for the necessary connection to the indicating and the potential source. It will also be observed that the pins upon which the wires are wound need not be insulating but may also act as the terminal pins for the connection of the wires to the indicating instrument and to the potential source usually employed in Wheatstone bridge arrangements. The wires are conventional in unbonded electrical strain gages, wound around under some initial tension so that the wires 8, 9, 10, and 11 are stressed.

As illustrated the transducer is employed as a force measuring instrument in a manner similar to the instrument described in the Statham Patent No. 2,453,551. The ring 1 is bored with a bore 13 and encased in a casing 12 suitably provided with a top and bottom 17 and an electrical outlet 18. The rods 14 pass through the casing 12 and are suitably sealed with O ring seals at 15 and terminate in heads 16. It will be observed that the two rods 14 are axially disposed with their axes upon the diameter of the ring 1, 45° disposed to that upon which the pins 4 and 6 and 5 and 7 are positioned.

It will be observed that any displacement of the heads 16 of the two rods 14, as, for example, resulting from an opposed pull on the rods, will cause a deflection of the ring 1 so as to cause the pins 4 and 6 and 5 and 7 to approach and the pins 4 and 5 and 6 and 7 to depart from each other. This will decrease the strain in the wires 9 and 10 and increase the strain in the wires 8 and 11. When suitably connected in a bridge circuit, as in the case of the strain gages previously referred to, and unbalance of the bridge results which may be calibrated against the displacement or the amount of force causing the same in a manner similar to that described for the strain gages previously referred to.

Experience with this form of device has shown that the gages have no substantial hysteresis; in other words, an increment of displacement between the head 16 results in the same degree of unbalance whether this incremental change in relative position of the head results from an increase in the separation or a decrease thereof. In this respect it differs in function from the type of devices previously referred to, all of which show substantial hysteresis, depending upon whether the applied force or displacement is in one direction or in an opposite direction.

In the form illlustrated in Fig. 1, the pins which support the wires are directly connected by electrical conduits to the terminals 19 and 20 which may then be connected to cables in a manner similar to those now employed for strain wire gages previously referred to and which are in wide commercial use, as will be understood by those skilled in the art.

Figure 6:
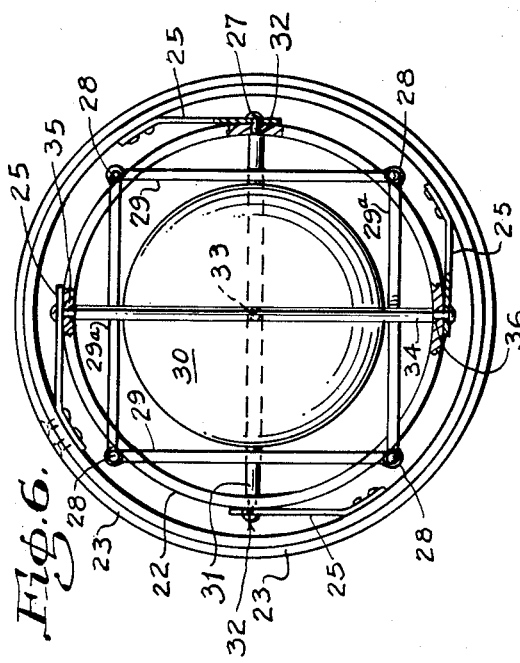
Fig. 6 is a section taken on line 6—6 of Fig. 5.
Figure 5:
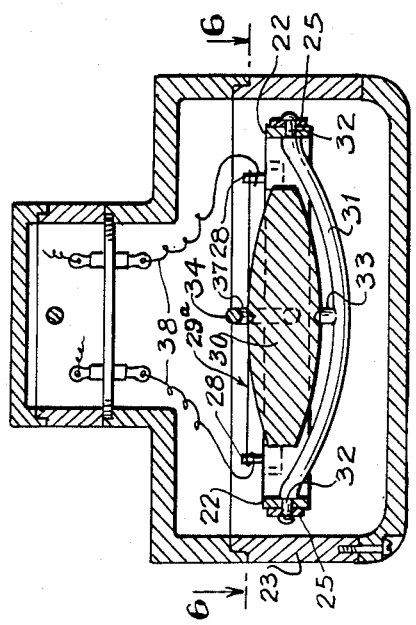
Fig. 5 is a sectional view of another application of the transducer shown in Figs. 1 and 2.

Figs. 5 and 6 illustrate the application of the principle of the deformable ring mounting for the strain wires to an accelerometer. As shown in these figures, the deformable flexible ring 22 is supported in the case 23 by four springs 25 mounted in case 23 and connected at four points on the ring separated by 90° from each other. The springs are flat and permit the displacement of the ring only in the plane of the ring and prevent it from tilting in any direction. The spring supports 25 are flexible and yieldable to permit the ring to be distorted within the plane of the ring, but are rigid against movement in a plane parallel to the springs. This limits the motion of the ring to deformation in the plane of the ring. The pins 28 are mounted in beads and bushings upon ring 22 in a manner similar to that shown in Fig. 3, and are positioned between the points of support 27, 32, 35, and 36, i. e., 45° from the point of each support for the ring, and hence are 90° from each other.

The wires are mounted and employed in the manner described in connection with instrument Figs. 1–3, and may be single strands or loops, forming a square and connected to the metallic pins in a Wheatstone bridge arrangement, as shown in Fig. 4, or four loops of wire as in the case of the transducer of Fig. 6 may be employed.

An inertial mass 30 is mounted upon the ring by means of two mutually perpendicular bent spring wire brackets 31 and 34 mounted at diametrically opposed points on the ring as shown at 27, 32, 35, and 36. The wire 31 passes underneath the mass 30, being concaved downward. At its midpoint a vertical boss 33 is brazed to the wire 31. The boss 33 bears centrally of the mass 30 and is rigidly affixed thereto as by brazing or soldering. The wire 34 passes over the top of the mass 30 and is connected at the central plane of the ring similarly to the wire 31 at two diametrically opposed points 35 and 36. A depending boss 37 is rigidly connected to the spring wire 34 at its midpoint and is rigidly connected to the mass 30 at a central point and is therefore axially opposed to the boss 33. The mass 30 is dimensioned so that it is within the square formed by the wires, as is shown in Fig. 6. The strain wires 27 are each connected by electrical conduits 38 to terminals in the manner previously described in connection with Fig. 2.

The instrument is an accelerometer and any acceleration imposed upon the case 23 will cause the mass 30 to move with respect to the case.

Thus, for example, if the mass moves downward with respect to the case it will exert a force on 33 to cause the spring wire 31 to become more convex and tend to flatten the spring wire 34. This will tend to pull the opposed points 32 toward each other and to push the points 35 and 36 away from each other. This will increase the strain in 29 and decrease the strain in 29a. The resultant unbalance will therefore give both the direction and the magnitude of the acceleration in a manner similar to that of other strain accelerometers previously referred to.

It will be observed that the springs 25 insure that the ring 22 moves with the case 23, since in the direction parallel to the face of the springs 25, the springs 25 are rigid bars, deflecting only upon the imposition of a force normal to the face of the springs 25. The spring rod 34 is bent in such manner that it passes over the wires 29, so that any deflection imposed on the spring by reason of the movement of the mass does not cause contact between the spring and the wires 29.

Figs. 7, 8 and 9 illustrate the application of a deformable ring transducer to a pressure gage. It will be observed that the transducer employed in Figs. 5 and 6 is also employed in Fig. 7. The ring 40 is similar to ring 22 and is mounted in four springs 41 similarly constructed and mounted as in the case of springs 25 upon the ring 22. The four metallic pins 42 are mounted in the same manner as pins 28 carrying the wire strands or wire loops 43 and 43a connected by conduits 44 to terminals 45 housed in the manner illustrated in Figs. 5 and 6. The concaved downward spring rod 46 is mounted in the manner described for rod 31 and the convex upward spring wire rod 47 is mounted on ring 40 in the same manner as is shown for 34 previously referred to. At their central points the rods 46 and 47 are connected by a rigid rod 48 which connects the central point of the spring rod 47 and spring rod 46. Positioned beneath the deformable transducer is a diaphragm 49 which separates the space 50 in which the transducer is positioned from the pressure chamber 51 which is formed by diaphragm 49 suitably sealed by a gasket seal against the casing housing bottom 52 in which a pressure connection 53 is provided.

Centrally of the diaphragm 49 is positioned a boss 54 which may be connected to the central point of 46 beneath the rod 48 as by brazing or soldering. It will be observed that the imposition of pressure on 53 will cause a deflection of the diaphragm 49 to bear against the rod 46 and cause it to be bent so as to become flattened at the same time making the rod 47 more convex. This causes a distortion of the ring, resulting in a decrease in the tension on 43 and increase in the tension on 43a or a decrease in the tension on 43a and increase in 43, depending upon the direction of motion of the boss 54 as the result of the pressure variations introduced in 53. Thus, as in the case of the accelerometer, a force axially of the ring is transferred by the bent spring to a deforming force on the ring acting in the plane of the ring. In all of the forms illustrated in Figs. 1 to 9, inclusive, we may employ one, two, or three, as well as the four active, i. e., stressed wire, loops. Where less than four are used, the remaining arms of the Wheatstone bridge may be provided by auxiliary resistances. It will be observed that the wires extend along non-diametric chords of the circle in the forms shown in Figs. 1–9. They may be stretched along diameters, i. e., the diametric chord, thereof, suitably spacing the wires all on one side or two on each side of the ring, spaced from each other to avoid electrical contact with each other except through the terminal pins.

In the forms shown in Figs. 1–9, each of the chord lines is of equal length and the four arms of the bridge are of the same characteristics, resulting in a balanced Wheatstone bridge arrangement. If desired, however, by rearranging the arcuate separation of the pins other relationships of the bridge arms may be obtained, compensating resistances being provided if necessary to produce the original bridge balance.

The strain wire elements, when more than one is employed, are preferably mounted on chord lines disposed at a right angle or acute angle to each other so that on deformation of the ring at least one of the strain wire elements is increased in strain and at least another is decreased in strain.

In the forms shown in Figs. 1 to 9, inclusive, it is desirable that the spring rate of the wires form but a small fraction of the spring rate of the instrument; that is, the stiffness of the instrument is large as compared to the wires. The rigidity of the ring 1 of Fig. 1, or the rings 22 and the spring wires 31 and 34 in Figs. 5 and 6, and similar rings and wires in Figs. 7 to 9, inclusive is sufficiently great so that the tension imposed in winding the wires 11 causes no measurable deflection of the ring. This is desirable since in winding the strain wires under tension, if the spring rate of the ring or the ring and the spring rods is low as compared to the spring rate of the wires, an undesirable buckling of the rings will occur, the ring bending between the pins. This is because the deformable structure in connecting the pin would be very flexible at points between the pins. Such a structure would be unstable and slight additional distorting forces may cause large deformation in the ring. To avoid such a result, a deformable structure is employed which is deformable in the portions between the points of connection to the pins, but the spring rate at such portions is greater than the spring rate of the wire. In such case the stress imposed upon the wires in winding causes no substantial deformation at those portions of the structure which lie between the pins. This limits the use of this type of instrument to the measurement of forces or displacement caused by forces which are of a relatively large order of magnitude as compared with any substantially in excess of the stress imposed upon the wires in winding.

These systems therefore may be termed high energy systems, since the energy which must be expended to deform the systems and cause them to respond will be far in excess of that necessary to vary the stresses in the wires themselves.

For many uses, however, it is desirable that the spring rate of the system be more nearly that of the spring rate of the wires, and preferably less and, in fact, but a small fraction of the spring rate of the spring wires. In such systems the energy necessary to deform the structure approaches the energy necessary to vary the stress in the wires; in other words, the fraction of the energy necessary to cause the variation in the strain wires is the major part and may constitute in excess of 90% and even higher percentage of the total energy expended in deforming the structure and varying the strain in the wire. These systems are low energy systems, since the energy necessary to cause these changes in strain in the wire in such transducers is low. The magnitude of the force needed is of the order of 1 or 2 ounces. For example, when used in accelerometers the mass employed may be made small or when used in pressure gages the mass may be employed to measure low pressures and small variations in pressure and respond to small forces generally, as indicated above.

To accomplish this result the deformable system upon which the pins are mounted is formed so as to localize the deformation and to construct the remaining portions of the structure substantially rigid. By making the localized points of deformation of a very low spring rate, for example, equal to or substantially less than the strain wire system, a deformable transducer structure is obtained with a spring rate approaching that of the wires and localizing the points of deformation. The structure will deform in a predetermined manner on the imposition of a predetermined deforming force and such structures are stable. Such systems are illustrated in Figs. 10 to 15, inclusive.

Fig. 10 illustrates one form of such structure. The transducer is mounted in a case 55 and composed of four rigid arms 56, 57, 58, and 59. They are hinged as shown on pins 60, 61, 62, and 63, all similarly constructed, as illustrated in Figs. 11 and 12. The pins form a torsional spring hinge. They are formed of a cylinder, milled out intermediate the cylindrical ends 64 and 65. Between these cylindrical ends the pin is milled out with four 90° cuts 68 to give a cross formed of mutually perpendicular spring walls 66 and 67. The walls are relatively thin so that they form flexible springs mutually perpendicular to each other and integral at the center and integral with and connecting the ends 64 and 65.

The rods, for example, 56 and 57, acting as arms of the deformable structure, are connected to the end 64, and the rod 57 rigidly connected to the end 65, at 90° to each other, the other rods being similarly connected, so that upon any alteration of the angle between the rods a twist occurs in the flat springs 66 and 67 which thus act as a torsional spring hinge. It will be observed that except when in torsion around the axis of the pin passing through 68', the juncture point of the spring walls 66 and 67, the pin acts as a rigid bar.

The pin 60 mounted on the rods 56 and 57 may be connected to a force transmitting rod 69 passing through an opening 70 in the case 55 and connected by a yoke 71' at ends 64 and 65 of the pin 60. The pin 62 is mounted in a yoke bracket 71 in which the pins 60 and ends 64 and 65 are rotatably mounted.

The wire supporting pin 72 is mounted upon the arm 58 at a midpoint between the pins 61 and 62 in the manner described for the other forms of transducer and as illustrated in Fig. 3. Pin 73 is similarly mounted upon the arm 56 and the pin 74 is similarly mounted upon the arm 57 and pin 75 is similarly mounted on arm 59. Wires are strung between these pins in the same manner as described in the previous form. Single strands or loops may be wound around the pins 72, 73, 74, and 75 and in electrical contact therewith, the pins being spaced from the arms 56 and 57 and 58 and 59 so that they are not in contact with the arms.

Instead of single strands of wire 76, 77, 78, and 79, a loop of wire may be wound between 72 and 73 in place of 76, similarly between 73 and 74, similarly between 74 and 75, and similarly between 75 and 72.

It will be observed that the loops or strands are mutually perpendicular to each other in a square formation. These wires are wound under tension but since the net force on the arms 56, 57, 58, and 59 is the result of the winding of the wire perpendicular to the arms 56 to 59, inclusive, respectively, no deforming force on the square formed by the arms occurs. However, if a force is imposed on 69 to either push or pull it, the arms 56, 57, 58, and 59 will be moved into a diamond shape, causing twist to occur in the torsional hinge upon which the arms are connected. Depending upon whether the arms 69 move in or out the stress on one pair of wires will be increased or decreased while the stress on the wires perpendicular to the first pair will be decreased or increased respectively.

Suitable conduits connecting the pins 72, 73, 74, and 75 to terminals, as illustrated in Figs. 1-9, may also be employed and suitably positioned in case 55 and connected to recording and indicating means in a normal Wheatstone bridge arrangement. The variation in strain in the wires resulting from the movement of 69 results in an unbalance in the bridge and is measured in a manner previously described.

The spring rate of this system of arms 56-59, inclusive depends upon the spring rate of the torsional hinge upon which the arms are mounted, the arms being rigid between these localized points of deformation. The spring rate of the hinge depends upon thickness and dimension of the spring connectors 67 and 66 and of the pin. For small pins the spring walls 66 and 67 may be made so thin that the spring rate of the hinge is less and substantially less and, in fact, but a few per cent of the spring rate of the wire conventionally employed in unbonded electrical resistance strain wire gages.

It will be observed that this particular type of torsional spring hinge is particularly adapted to this service because the spring walls 66 and 67 are formed integrally with each other and with the pin ends 64 and 65 and no clamping or other connecting means are necessary to connect the springs in the cross formation or to connect the pin ends 64 and 65 to the spring walls 66 and 67.

Additionally, it will be noticed that the arms 56-59, inclusive, can be rigidly connected to the pin ends 64 and 65 so that no lost motion nor any relative motion of the pin ends 64 or 65 and the arms mounted thereon occurs.

Such a transducer may be employed for various uses to which strain wire gage transducers have been used; for example, pin 69 may be connected to a diaphragm of a pressure gage or to a mass of an accelerometer. The mass may be directly mounted on the arms 57, 56, and 59, inclusive, or upon any one of them.

Figure 15:
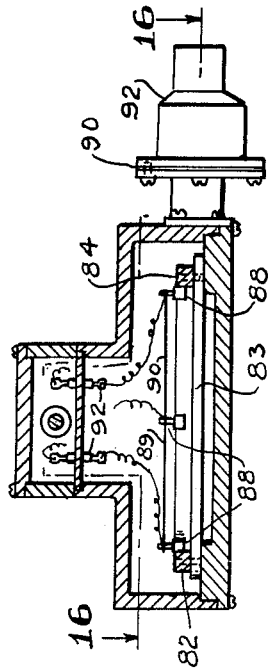
Fig. 15 is a view of another application of the transducer of the invention as applied to a pressure gage.

Thus, Figs. 15 and 16 illustrate the application of this principle in a transducer employed in a pressure gage.

In the form shown in Fig. 10 the force is applied at the point of juncture of the arms. In the form shown in Figs. 15 and 16 the force is applied parallel to the arms. Thus the distortable transducer of Figs. 15 and 16 is mounted in case 80 and is composed of four rigid arms 81, 82, 83, and 84 hingedly connected by torsional hinges 87 in the same manner as are the arms 56-59, inclusive, employing the pins such as illustrated in Figs. 11 and 12, as described above. One of the arms, for example 81, is rigidly mounted in the case upon a bracket 85. One of the other of the three arms, for example, 84, has an extension 86 which is connected to a rod 88' by a torsional hinge such as is used at 87, shown at 87'. The rod passes through an opening 89 and a fitting 90 and is connected to a bellows 91 mounted in a fitting 92 to which a pressure connection is made. The pins 88 similar to pins 72–75, inclusive are mounted on arms 83, for example, in the same manner as shown in Fig. 3, employing an insulating bushing or bead 3 with bushings such as 2. The pins are positioned midway between the torsional spring hinges 87 and wires 89 and 90 are wound in a manner similar to that described for wires 76 to 79, inclusive. The pins are connected by conductors 91 to four terminals 92 in the same manner as for the previous forms and are employed in the form illustrated previously. The pressure imposed upon 92 will cause the rod 88' to advance, rocking the arm 84 and thus distorting the structure to cause the strain on the wires 89 to decrease and to increase on 90. The reverse movement has the opposite effect. This causes an unbalance in the bridge which is measured in the usual way.

In Figs. 17 and 18 the system shown in Fig. 14 is applied to an accelerometer. A variation in the hinge connection between the four rigid arms is also illustrated, which, if desired, could also be used in place of the structure of Figs. 10 to 16, inclusive. In place of the hinge, the torsional spring hinge of Figs. 9–16, inclusive could be employed in the forms shown in Figs. 17 and 18.

A square of metal or other rigid material is cut out in the form shown in Fig. 17 to provide four rigid arms 93, 94, 95, and 96. The corners of the square are notched at 97, leaving a thin portion of metal at 98. The depth of the notch and the thickness of the metal at 98 determine the spring rate of the hinge connection between the mutually perpendicular arms. There is thus formed a spring hinge between the arms which is rigid except at the localized spring hinge connection. One of the arms, for example 94, may be rigidly mounted upon a bracket 99 in case 100. Pins 101 are mounted midway between the hinge points in the manner described for the other forms particularly in the manner shown in Fig. 3, and wires 102 are wound in a manner similarly described for the other forms, and the pins connected by conduits 103 to terminals 104 as described above.

It will be observed that the instrument as described is an accelerometer due to the mass of the arms 93, 95, and 96, so that acceleration imposed on case 100 will cause the arms to act as an inertial mass, and since the arm 94 travels with the case 100 the structure will be distorted from its square form to a diamond form. If the mass is insufficient or it is desired to increase the mass of the arms, additional weight, illustrated as 105, may be mounted on one of the arms, for example, 96. Thus an acceleration in a direction parallel to the arm 94 will cause the structure to become deformed and the Wheatstone bridge, of which the strain wires form the arms, become unbalanced. The acceleration may thus be determined in the manner described above and in the prior art above referred to.

It will be observed that in Figs. 10–17, inclusive, we have provided four hinged rigid bars in an initial square formation and have strung the electrical resistance strain wires in a square formation, employing four strain wire elements, all of which are active, i. e., subjected to a variable strain and forming the four arms of a Wheatstone bridge. We may, however, employ one, two, or three as well as four active wire elements, supplying the remaining resistance of the Wheatstone bridge by means of compensating resistances, as described above and in connection with the forms of Figs. 1–9. The wires, where more than one active arms are employed, are strung in the deformable structure at an angle to each other, i. e., do not extend in parallel arrangement, whereby the strain is increased in one set when the strain is decreased in another.

Thus, instead of using four rigid bars formed into a square or diamond shape, more than four bars may be employed in a suitable geometric structure. In all such structures the arms are arranged in a polygonal structure such as a square, diamond, pentagon, etc., the rigid arms of which are connected by hinge points and are deformable by movement of the rigid arms around their hinge points. In all such cases I need not hinge them at 90°, but may hinge them at any desired angular relation to each other which results in a deformable structure by rotation of the arms about the hinge point.

While we have described a particular embodiment of our invention for the purpose of illustration, it should be understood that various modifications and adaptations thereof may be made within the spirit of the invention as set forth in the appended claims.

We claim:

1. An electrical strain wire transducer, comprising a deformable circular ring, electrical strain wires mounted directly upon and extending between spaced points upon the chord lines of said circular ring, each of said points moving with respect to all other of said points on deformation of said ring.

2. An electrical strain wire transducer, comprising a deformable circular ring, electrical strain wires mounted directly upon and extending between spaced points upon non-diametric chord lines of said circular ring, each of said points moving with respect to all other of said points on deformation of said ring.

3. An electrical strain wire transducer, comprising a deformable circular ring, four electrical strain wires mounted directly upon and extending between spaced points upon four equal chord lines of said circular ring, each of said points moving with respect to all other of said points on deformation of said ring.

4. An electrical strain wire transducer, comprising a deformable circular ring, electrical strain wires mounted directly upon and extending between spaced points upon the chord lines of said circular ring, each of said points moving with respect to all other of said points on deformation of said ring, and resilient suspending means for said ring adapted for distortion of said ring in the plane of said ring, said suspending means comprising means for rigidly mounting said ring against displacement in all other directions.

5. An electrical strain wire transducer, comprising a deformable circular ring, electrical strain wires mounted upon and extending between spaced points upon non-diametric chord lines of said circular ring, means for resiliently suspending said ring for distortion of said ring in the plane of said ring, said suspending means including means for rigidly mounting said ring against displacement in all other directions.

6. An electrical strain wire transducer, comprising a deformable circular ring, four electrical strain wires mounted upon and extending between spaced points upon four equal chord lines of said circular ring, means for resiliently suspending said ring adapted for distortion of said ring in the plane of said ring, said suspending means comprising means for rigidly mounting said ring against displacement in all other directions.

7. An electrical strain wire transducer, comprising a deformable circular ring, electrical strain wires mounted upon and extending between spaced points upon the chord lines of said circular ring, means for resiliently suspending said ring for distortion of said ring in the plane of said ring, said suspending means comprising means for rigidly mounting said ring against displacement in all other directions, means for applying a displacing force axially of said ring, and means for transforming said axial force into a deforming force in the plane of said ring.

8. An electrical strain wire transducer, comprising a deformable circular ring, electrical strain wires mounted upon and extending between spaced points upon non-diametric chord lines of said circular ring, means for resiliently suspending said ring for distortion of said ring in the plane of said ring, said suspending means comprising means for rigidly mounting said ring against displacement in all other directions, means for applying a displacing force axially of said ring, and means for transforming said axial force into a deforming force in the plane of said ring.

9. An electrical strain wire transducer, comprising a deformable circular ring, four electrical strain wires mounted upon and extending between spaced points upon four equal chord lines of said circular ring, resiliently suspending means for said ring adapted for distortion of said ring in the plane of said ring, said suspending means comprising means for rigidly mounting said ring against displacement in all other directions, means for applying a displacing force axially of said ring, and means for transforming said axial force into a deforming force in the plane of said ring.

10. A strain wire transducer comprising a plurality of strain wires, a deformable structure, a plurality of adjacent wire supports, said wire supports being mounted on said deformable structure, each end of each of said wires being connected to one of said supports, and means in said structure permitting deformation of said structure between each of said adjacent supports, all of said supports moving in spatial relation to each other on any deformation of said structure, the said means on deformation of the structure moving the supports for the ends of one of said wires away from each other to cause said wire to increase in tension and the said means on such deformation of the structure also moving the supports for the ends of another of said wires toward each other to relax the tension in said wire, two of said adjacent supports approaching each other, and two of said adjacent supports separating from each other upon such deformation of said deformable structure.

11. An electrical strain wire transducer comprising a deformable structure and means for applying a force to said deformable structure to cause deformation thereof, a plurality of insulated pins mounted on said deformable structure, electrical strain wires mounted upon and extending between said pins, points of deformation in said structure between each of said pins, said structure being deformable, at each of said points, on application of said deforming force, all of said pins moving with respect to each other upon said deformation.

12. An electrical strain wire transducer comprising a deformable structure and means for applying a force to said deformable structure to cause deformation thereof, a plurality of electrical strain wires mechanically connected to said deformable structure at spaced points, points of deformation in said structure between each of said spaced points, said deformable structure being deformable, at each of said points of deformation, upon application of said deforming force, all of said spaced points moving with respect to each other upon said deformation.

13. An electrical strain wire transducer comprising a deformable structure, four pins adjacently mounted in said deformable structure, four strain wires extending between said four pins, said structure being deformable at points between adjacent pins, the linear dimension between each pair of adjacent pins varying upon deformation at said deformable points.

14. An electrical strain wire transducer comprising a deformable structure and means for applying a force to said deformable structure to cause deformation thereof, a plurality of strain wires mechanically connected to said deformable structure at spaced points, points of deformation in said structure between each of said spaced points, said deformable structure being deformable, at each of said points of deformation, upon application of said deforming force, all of said spaced points moving with respect to each other upon said deformation, said motion imposing a variable strain in each of said wires, the spring rate of said deformable structure being substantially in excess of the spring rate of said wires.

15. An electrical strain wire transducer comprising a deformable structure and means for applying a force to said deformable structure to cause deformation thereof, a plurality of strain wires mechanically connected to said deformable structure at spaced points, points of deformation in said structure between each of said spaced points, said deformable structure being deformable, at each of said points of deformation, upon application of said deforming force, all of said spaced points moving with respect to each other upon said deformation, said motion imposing a variable strain in said wires, the spring rate of said wires being substantially in excess of the spring rate of said deformable structure.

16. An electrical strain wire transducer comprising a deformable polygonal structure, comprising a plurality of adjacent rigid bars, hinge connections between adjacent bars to form a deformable polygonal structure, a plurality of strain wires, one end of each of said strain wires being connected to one of said bars intermediate said hinge points and the other end of said wire being connected to an adjacent bar intermediate the hinge connections to said adjacent bar.

17. An electrical strain wire transducer comprising a deformable square point formed of four rigid bars, hinges at each end of each of said bars at the angle of said square, four strain wire elements, each of said strain wire elements being connected to a point on each of two of said bars, said points being intermediate the hinge points at the end of said bar, said wires being electrically joined into a square formation at said points of connection and otherwise insulated from each other, and means for connecting an electrical lead to each of said points for subsequent connection to electrical circuits.

18. An electrical strain wire transducer comprising a deformable square formed of four rigid bars, hinges at each end of each of said bars, four strain wire elements, each of said strain wire elements being connected to a point on each of two of said bars, said points of support being intermediate the hinge points at the end of said bars, said wires being electrically joined into a square formation at said points of support and otherwise insulated from each other, means for connecting an electrical lead to each of said points for subsequent connection to electrical circuits, means connected to one of said hinge points for applying a deforming force to one of said hinge points, a support for said deformable square, and means for mounting a hinge point on said last-named support, said last-named hinge point being diametrically positioned from said hinge point to which said deforming force applying means is connected.

19. An electrical strain wire transducer comprising a deformable square formed of four rigid bars, hinges at each end of each of said bars at the angle of said square, four strain wire elements, each of said strain wire elements being connected to a point on each of two of said bars, said points being intermediate the hinge points at the end of said bar, said wires being electrically joined into a square formation at said points of connection and otherwise insulated from each other, means for connecting an electrical lead to each of said points for subsequent connection to electrical circuits, a support for said square, means for rigidly mounting one of said arms on said last-named support, and means for applying a deforming force to another of said arms.

20. A strain wire transducer comprising a plurality of strain wires, a plurality of adjacent wire supports, each end of each of said wires being mounted to one of said supports, a deformable structure, said wire supports being mounted on said deformable structure between each of said adjacent supports, means upon said structure permitting deformation of said structure between each of said adjacent supports, all of said supports moving in spatial relation to each other on any deformation of said structure, said means moving adjacent supports for the ends of one of said wires away from each other to cause said wires to increase in tension and the said means also moving the adjacent supports for the ends of another of said wires toward each other to relax the tension on said wires.

21. An electrical strain wire transducer comprising a rectangular deformable structure and means for applying a force to said deformable structure to cause deformation thereof, a plurality of insulated pins mounted on said deformable structure, electrical strain wires mounted upon and extending between said pins, points of deformation in said structure between each of said pins, said structure being deformable at each of said points on application of said deforming force, all of said pins moving with respect to each other upon said deformation, said rectangular structure comprising a hollow rectangle weakened at the corners of said rectangular structure, said weakened portion forming hinge points.

22. An electrical strain wire transducer comprising a rectangular deformable structure and means for applying a force to said deformable structure to cause deformation thereof, a plurality of insulated pins mounted on said deformable structure, electrical strain wires mounted upon and extending between said pins, points of deformation in said structure between each of said pins, said structure being deformable at each of said points on application of said deforming force, all of said pins moving with respect to each other upon said deformation, said rectangular structure comprising a hollow rectangle weakened adjacent said wire supports, said weakened portions forming hinge points, a housing, said housing enclosing said deformable structure, one of the sides of said deformable rectangular structure being fastened against relative motion to the enclosing housing.

23. An electrical strain wire transducer comprising a hollow rectangular deformable structure, said rectangular structure comprising a hollow rectangle at the corners weakened to form hinge points, and means for applying a force to said deformable structure to cause deformation thereof, a plurality of insulated pins mounted on said deformable structure, electrical strain wires mounted upon and extending between said pins, points of deformation in said structure between each of said pins, said structure being deformable at each of said points on application of said deforming force, all of said pins moving with respect to each other upon said deformation.

LOUIS D. STATHAM.
GIFFORD E. WHITE.

REFERENCES CITED

The following references are of record in the file of this patent:

UNITED STATES PATENTS

| Number | Name | Date |
|---|---|---|
| 2,036,458 | Carlson | Apr. 7, 1936 |
| 2,393,714 | Simmons | Jan. 29, 1946 |
| 2,453,551 | Statham | Nov. 9, 1948 |